United States Patent
Kashtan et al.

(10) Patent No.: US 12,050,943 B1
(45) Date of Patent: Jul. 30, 2024

(54) TARGETED UNPRIVILEGED PORT CONFIGURATION

(71) Applicant: Red Hat, Inc., Raleigh, NC (US)

(72) Inventors: Yuval Kashtan, Newton, MA (US); Mario Vazquez Cebrian, Valencia (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/319,002

(22) Filed: May 17, 2023

(51) Int. Cl.
- G06F 21/44 (2013.01)
- G06F 9/445 (2018.01)
- G06F 9/54 (2006.01)

(52) U.S. Cl.
CPC .......... *G06F 9/545* (2013.01); *G06F 9/44505* (2013.01); *G06F 9/4451* (2013.01); *G06F 21/44* (2013.01)

(58) Field of Classification Search
CPC ...... G06F 9/545; G06F 9/44505; G06F 21/44; G06F 9/4451; G06F 9/451; G06F 9/4806
USPC .......................... 709/203, 220, 224, 225, 228
See application file for complete search history.

(56) References Cited

U.S. PATENT DOCUMENTS

| | | | |
|---|---|---|---|
| 8,028,071 B1 * | 9/2011 | Mahalingam | H04L 69/32 718/1 |
| 9,251,384 B1 * | 2/2016 | Potlapally | G06F 21/82 |
| 9,286,106 B1 * | 3/2016 | Huang | G06F 9/4881 |
| 9,473,598 B2 * | 10/2016 | Kashyap | H04L 69/162 |
| 9,743,598 B2 * | 8/2017 | McCarthy | A01H 6/822 |
| 10,003,554 B1 * | 6/2018 | Zidenberg | H04L 49/25 |
| 10,812,521 B1 * | 10/2020 | Sharifi Mehr | H04L 63/1433 |
| 11,074,114 B1 * | 7/2021 | Kostyushko | G06F 9/45537 |
| 11,117,046 B1 * | 9/2021 | Denbigh | A63F 3/00643 |
| 11,561,898 B1 * | 1/2023 | Grubisic | G06F 3/062 |
| 2016/0127488 A1 * | 5/2016 | Papakostas | H04L 65/1066 709/224 |
| 2018/0332012 A1 * | 11/2018 | Koster | H04L 9/0891 |
| 2021/0045125 A1 * | 2/2021 | Mondal | H04W 80/08 |
| 2021/0352044 A1 * | 11/2021 | Asveren | H04L 47/20 |
| 2022/0021615 A1 * | 1/2022 | Boutros | H04L 61/256 |
| 2022/0021645 A1 * | 1/2022 | Boutros | H04L 12/66 |

(Continued)

FOREIGN PATENT DOCUMENTS

| | | | | |
|---|---|---|---|---|
| CA | 2233359 A1 * | 9/1999 | | G06Q 10/109 |
| CA | 2517442 C  * | 4/2011 | | G06F 21/53 |

OTHER PUBLICATIONS

"Allow non-root process to bind to port 80 and 443?", downloaded from https://superuser.com/questions/710253/allow-non-root-process-to-bind-to-port-80-and-443 , 2014, 10 pp. total.

(Continued)

*Primary Examiner* — Khanh Q Dinh
(74) *Attorney, Agent, or Firm* — Womble Bond Dickinson (US) LLP

(57) ABSTRACT

Systems and methods for implementing a targeted port allowance for unprivileged processes are presented. The systems and methods determine, from a plurality of ports, a first set of ports from which a process is configured to receive information. The systems and methods configure the first set of ports to be unprivileged, and then configure a second set of the plurality of ports to be privileged. The second set of ports includes each one of the plurality of ports that is absent from the first set of ports. In turn, the systems and methods bind the process to the first set of ports.

19 Claims, 6 Drawing Sheets

(56) References Cited

U.S. PATENT DOCUMENTS

| | | | |
|---|---|---|---|
| 2022/0034904 A1* | 2/2022 | Vashist | C12Q 1/70 |
| 2022/0201638 A1* | 6/2022 | Arrobo Vidal | H04W 48/18 |
| 2022/0345439 A1* | 10/2022 | Wheelock | H04L 61/5014 |

OTHER PUBLICATIONS

"Run the Docker daemon as a non-root user (Rootless mode)", downloaded from https://docs.docker.com/engine/security/rootless/, 2020, 12 pp. total.

* cited by examiner

TARGETED UNPRIVILEGED PORT CONFIGURATION

TECHNICAL FIELD

Aspects of the present disclosure relate to unprivileged port configuration, and more particularly, to targeted port allowance for unprivileged processes in a computing environment.

BACKGROUND

In a computer system that executes an operating system, such as a Linux operating system, the operating system configures ports as communication endpoints that are used by processes to send or receive network data. Ports facilitate the transfer of data between computers and are configured as privileged ports or unprivileged ports. A privileged port is a network port that can only be opened by a process with root privileges. Privileged ports are reserved for system services or applications that require administrative access. Unprivileged ports are used by client applications, processes, and services that do not require root privileges to operate.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
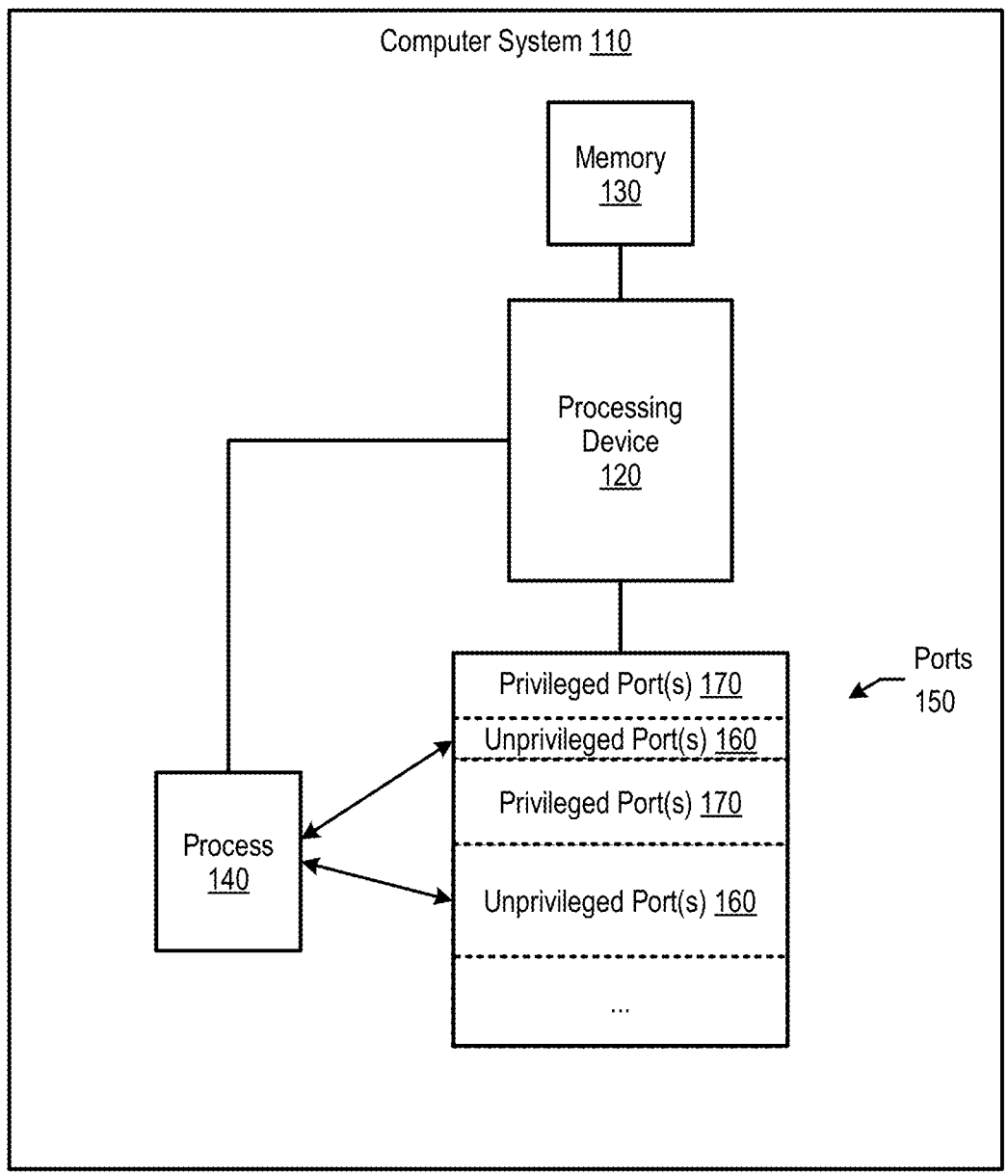
FIG. 1 is a block diagram that illustrates an example computer system, in accordance with some embodiments of the present disclosure.

As discussed above, computer systems configure ports as being privileged ports or unprivileged ports, where a process with root privileges may bind to the privileged ports and a process without root privileges (unprivileged process) may bind to the unprivileged ports. Some systems use a system control parameter that specifies the starting point for unprivileged ports, such as "ip_unprivileged_port_start." This parameter may have a default value (e.g., 1024), which means that ports with numbers greater than or equal to the default value (e.g., 1024-65535) are configured as unprivileged ports, and ports less than the default value (e.g., 0-1023) are configured as privileged ports. A challenge with this approach, however, is that the approach does not allow an unprivileged process to bind to and listen on a port that is below the start value (lower ports).

Some approaches allow an unprivileged process to bind to ports below 1024. These approaches, however, are a brute force approach that sets the ip_unprivileged_port_start to a lower value (e.g., 0), or through a net_bind_service capability. A challenge with this approach, however, is that this approach presents security issues because any unprivileged processes can now bind to any lower port that is configured as unprivileged.

The present disclosure provides an approach that addresses the above-noted and other deficiencies by configuring specific ports as unprivileged that are required by a process. The process determines a first set of ports, from a group of ports, from which a process is configured to receive information. The approach configures the first set of ports to be unprivileged, and then configures a second set of ports to be privileged. The second set of ports includes the remaining ports, from the group of ports, which are absent from the first set of ports. In turn, the approach binds the process to the first set of ports. In some embodiments, the process is an unprivileged process and the group of ports are between 0 and 1023. In some embodiments, the group of ports are between 0 and 65535.

In some embodiments, determining the first set of ports is based on a system control parameter provided to a kernel. In some embodiments, the approach adds an unprivileged port list to a configuration file. The unprivileged port list identifies the first set of ports from which the process is configured to receive the information. In some embodiments, the first set of ports are numbered non-contiguously.

In some embodiments, the approach determines a third set of ports from which a subsequent process is configured to receive subsequent information. The third set of ports includes one or more different ports from the first set of ports. The approach configures the third set of ports to be unprivileged, and configures a fourth set of the group of ports to be privileged. The fourth set of ports includes the remaining ports, from the group of ports, which are absent from the third set of ports. In turn, the approach binds the process to the third set of ports. In some embodiments, a kernel concurrently executes both the process and the subsequent process. The process executes in a first namespace and the subsequent process executes in a second namespace.

The present disclosure provides an approach that improves the operation of a computer system by configuring process-specific ports as unprivileged, which increases computer system security and reduces vulnerability of the computer system. In addition, the present disclosure provides an improvement to the technological field of real-time process execution by enabling a process to bind to required ports regardless of whether they are considered low ports (e.g., 0-1023) or high ports (e.g., 1024-65535).

FIG. 1 is a block diagram that illustrates an example computer system, in accordance with some embodiments of the present disclosure. Computer system 110 includes hardware such as processing device 120 (e.g., processors, central processing units (CPUs)), and memory 130 (e.g., random access memory (e.g., RAM)), storage devices (e.g., hard-disk drive (HDD), solid-state drive (SSD), etc.). In some embodiments, memory 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 130 may be configured for long-term storage of data and may retain data between power on/off cycles of the computer system 110.

Computer system 110 may execute or include an operating system (OS) such as a host OS. The host OS may manage the execution of other components (e.g., software, applications, etc.) and/or may manage access to the hardware (e.g., processors, memory, storage devices etc.) of the computing system 110. In some embodiments, computer system 110 may implement a control plane (e.g., as part of a container orchestration engine), a compute node (e.g., as part of the container orchestration engine), or a combination thereof.

Processing device 120 reads instructions from memory 130, which enables processing device 120 to determine which ports process 140 is configured to receive information. In some embodiments, processing device 120 determines this by reading a configuration file that includes an unprivileged ports list corresponding to process 140. In some embodiments, the unprivileged ports list is on a namespace basis and, in turn, processing device 120 may configure different unprivileged ports for different processes for different namespaces. A namespace allows the creation of isolated environments, where processes running inside the namespace are limited to a specific set of resources. Each namespace provides a virtualized view of one or more system resources, such as network interfaces, user IDs, process IDs, file systems, and more. In some embodiments, namespaces partition kernel resources such that one set of processes sees one set of resources (e.g., a set of unprivileged ports in ports 150) while another set of processes sees a different set of resources (e.g. a different set of unprivileged ports in ports 150). By using namespaces, multiple instances of an operating system can run on the same physical machine, each with its own isolated set of resources, as if it were running on its own separate system. This allows for better resource utilization, increased security, and easier deployment and management of applications.

Processing device 120 configures ports 150 as unprivileged ports 160 (e.g., a first set of ports) based on the requirements of process 140. In some embodiments, processing device 120 configures the remaining ports as privileged ports 170 (e.g., a second set of ports) that are not included in the unprivileged ports list. In some embodiments, processing device 120 configures unprivileged ports prior to configuring the privileged ports. In some embodiments, processing device 120 configures privileged ports prior to configuring the unprivileged ports.

Processing device 120 then binds process 140 to unprivileged ports 160 such that process 140 can listen to network traffic coming over unprivileged ports 160. Binding to a port associates a network socket with a particular port number on a given network interface. A network socket is an endpoint for sending or receiving data over a network, and is identified by an IP address and a port number. When a process binds to a port, the process specifies the port number the process wants to use and the type of transport protocol (e.g., TCP or UDP) the process wants to use for communication. The operating system then reserves that port number for the program's use and starts listening for incoming network traffic on that port. Binding to a port enables a process to receive incoming network connections and data on a specific port.

Figure 2:
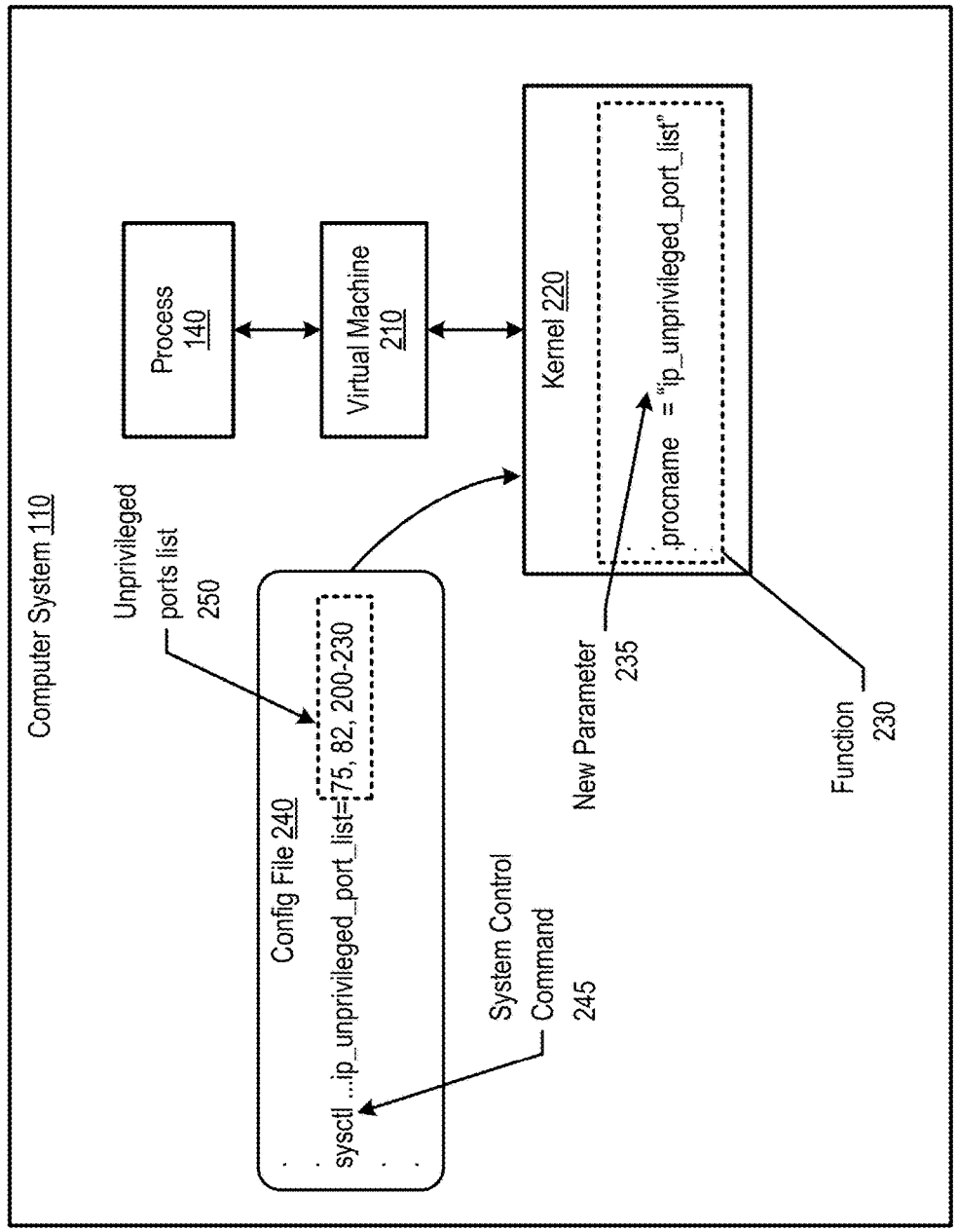
FIG. 2 is a block diagram that illustrates a kernel configuring unprivileged ports based on process requirements, in accordance with some embodiments of the present disclosure.

FIG. 2 is a block diagram that illustrates a kernel configuring unprivileged ports based on process requirements, in accordance with some embodiments of the present disclosure.

Computer system 110 includes process 140, which executes on virtual machine 210 with kernel 220. Kernel 220 executes on processing device 120 and is responsible for managing system resources, such as the CPU, memory, input/output devices, etc., and providing an interface between the hardware and software layers of an operating system.

Kernel 220 includes function 230, which a developer modifies to include new parameter 235. In some embodiments, such as a Linux environment, function 230 may be a sysctl_net_ipv4.c function. New parameter 235 adds an "ip_unprivileged_port_list" system parameter, which is configured to receive single ports (56, 65, etc.), a range of ports (200-210), or a combination thereof from a configuration file (e.g., configuration file 240) to indicate which ports to configure as unprivileged.

Computer system 110 includes configuration file 240. Configuration files are used to define the settings and options for various applications, services, and the operating system. Configuration files are typically text files that are read by software at runtime to determine behavioral characteristics. In some embodiments, configuration file 240 is an application/process configuration file to define an application's/process' behavior and settings, such as port requirements, web servers, databases, email servers, and file transfer protocols. In some embodiments, configuration file 240 is a system configuration file that defines global settings for the operating system, such as the hostname, network settings, kernel parameters, and system services.

Configuration file 240 includes system control (sysctl) command 245, which identifies the ports (unprivileged ports) for which process 140 is configured to receive information. "Sysctl" is a command-line utility that allows an administrator to view, modify and configure kernel 220 parameters at runtime. FIG. 2 shows that system control command 245 includes an unprivileged port list 250 of "75, 82, and 200-230," which are ports required by process 140. As such, kernel 220 configures ports 75, 82, and 200-230 to be unprivileged, and the remaining ports in a group of ports as privileged (see FIGS. 3, 4, and corresponding text for further details).

Figure 3:
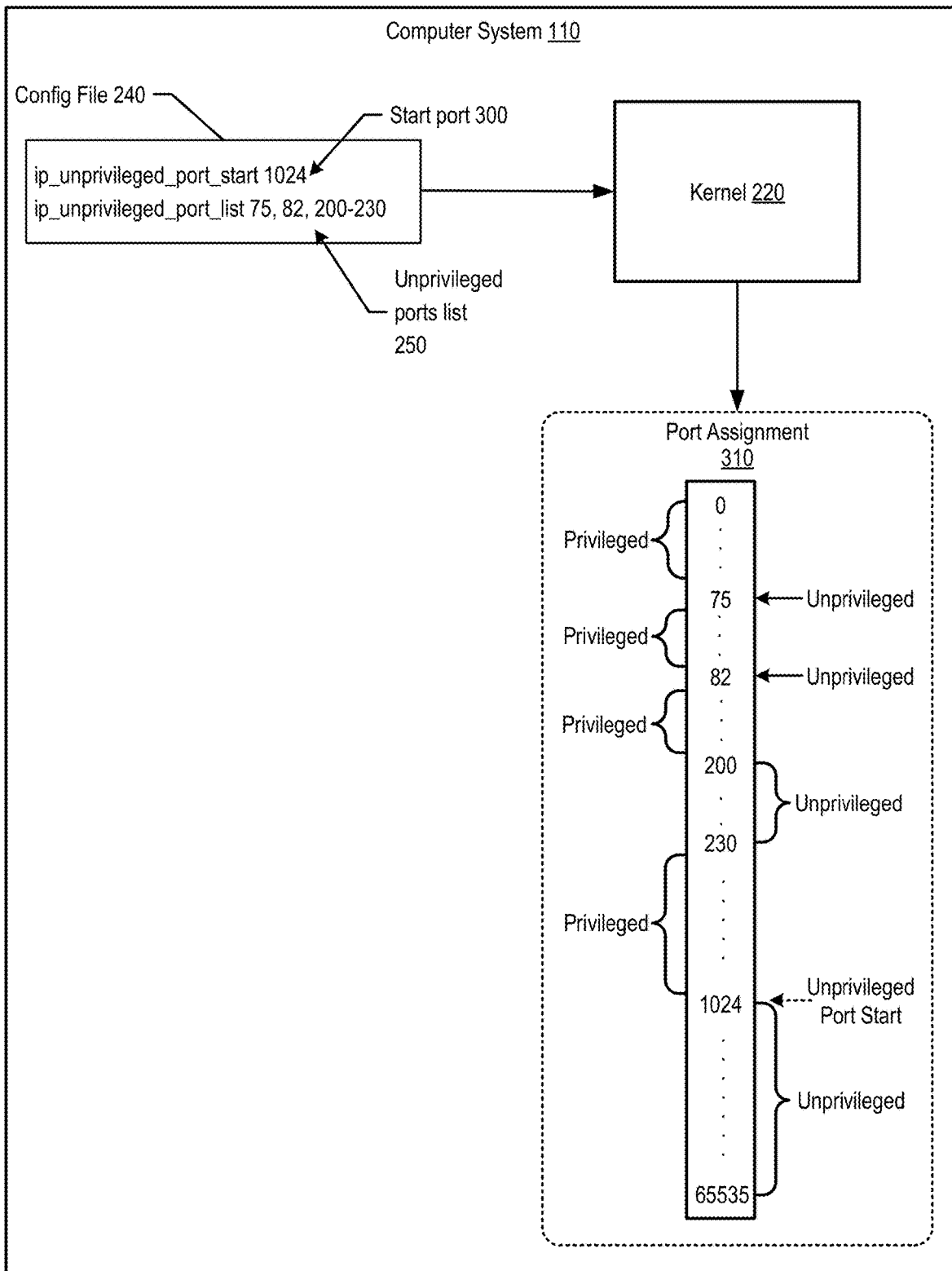
FIG. 3 is a block diagram that illustrates a kernel that configures ports based on a configuration file that includes an unprivileged port start location and an unprivileged port list, in accordance with some embodiments of the present disclosure.

FIG. 3 is a block diagram that illustrates a kernel that configures ports based on a configuration file that includes an unprivileged port start location and an unprivileged port list, in accordance with some embodiments of the present disclosure.

In some embodiments, configuration file 240 includes both an unprivileged ports start system control command with a starting location (start port 300) and an unprivileged ports list system control command with an unprivileged ports list 250. In these embodiments, as shown in port assignment 310, kernel 220 sets the start of the unprivileged ports based on start port 300, and also configures ports lower than start port 300 as unprivileged ports based on unprivileged ports list 250. Port assignment 310 shows that the unprivileged start port begins at 1024 and extends to 64435. In addition, ports 75, 82, and 200-230 are configured as unprivileged based on unprivileged ports list 250. All other ports are configured as privileged and therefore not accessible by process 140.

Figure 4:
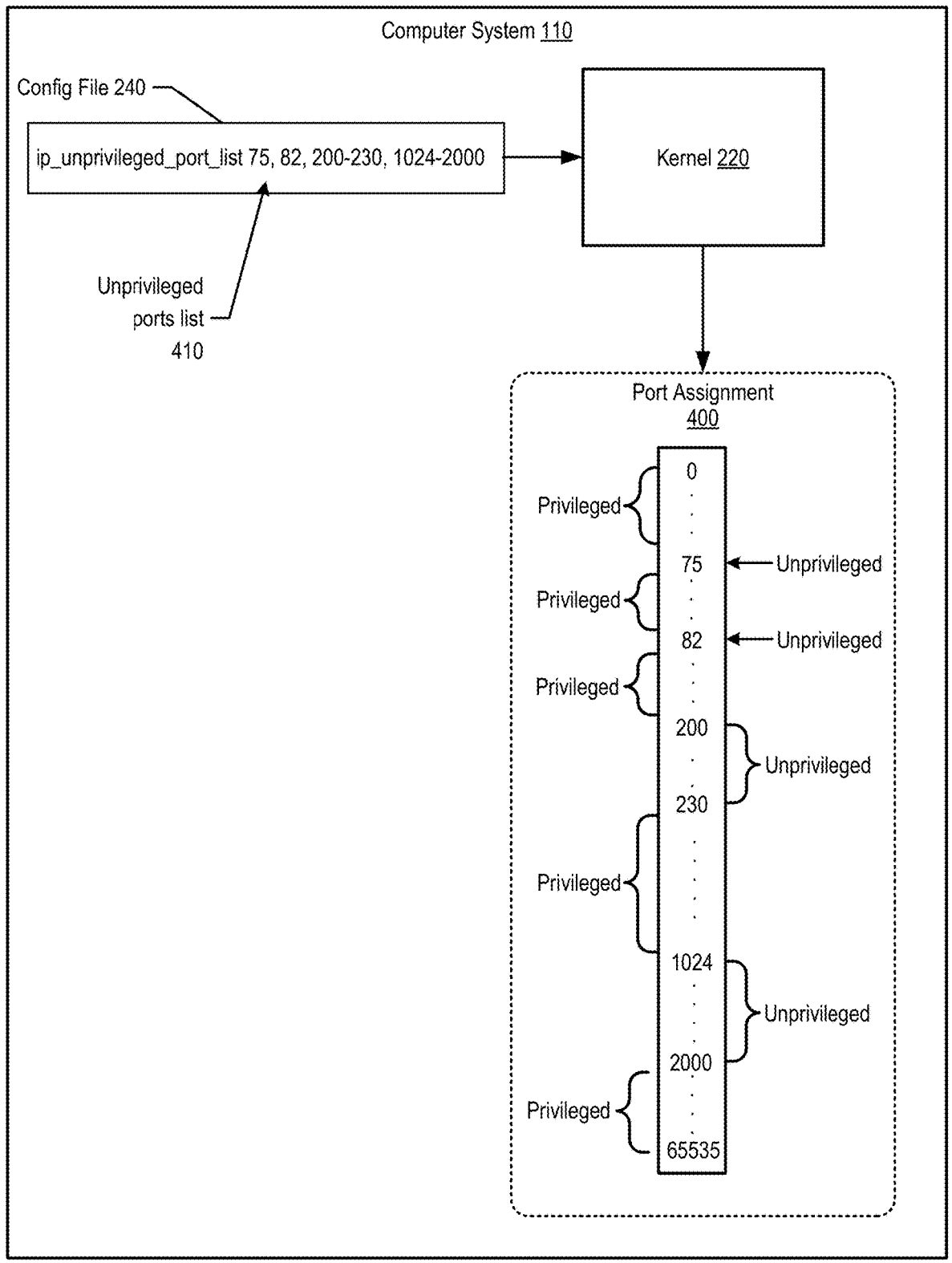
FIG. 4 is a block diagram that illustrates a kernel that configures ports based on a configuration file that includes an unprivileged port list, in accordance with some embodiments of the present disclosure.

FIG. 4 is a block diagram that illustrates a kernel that configures ports based on a configuration file that includes an unprivileged port list, in accordance with some embodiments of the present disclosure. FIG. 4 is similar to FIG. 3 with the exception that configuration file 240 includes an unprivileged ports list system control command to configure each of the unprivileged ports without using an unprivileged ports start system control command.

Configuration file 240 includes unprivileged ports list 410. Port assignment 400 shows that kernel 220 configures ports 75, 82, 200-230, and 1024-2000 as unprivileged. Kernel 220 also configures the remaining ports as privileged, which are ports 0-74, 76-81, 83-199, 231-1023, and 2001-65535. By configuring unprivileged ports without using an unprivileged ports start system control command, increased security may be provided by limiting the amount of overall unprivileged ports available to unprivileged processes.

Figure 5:
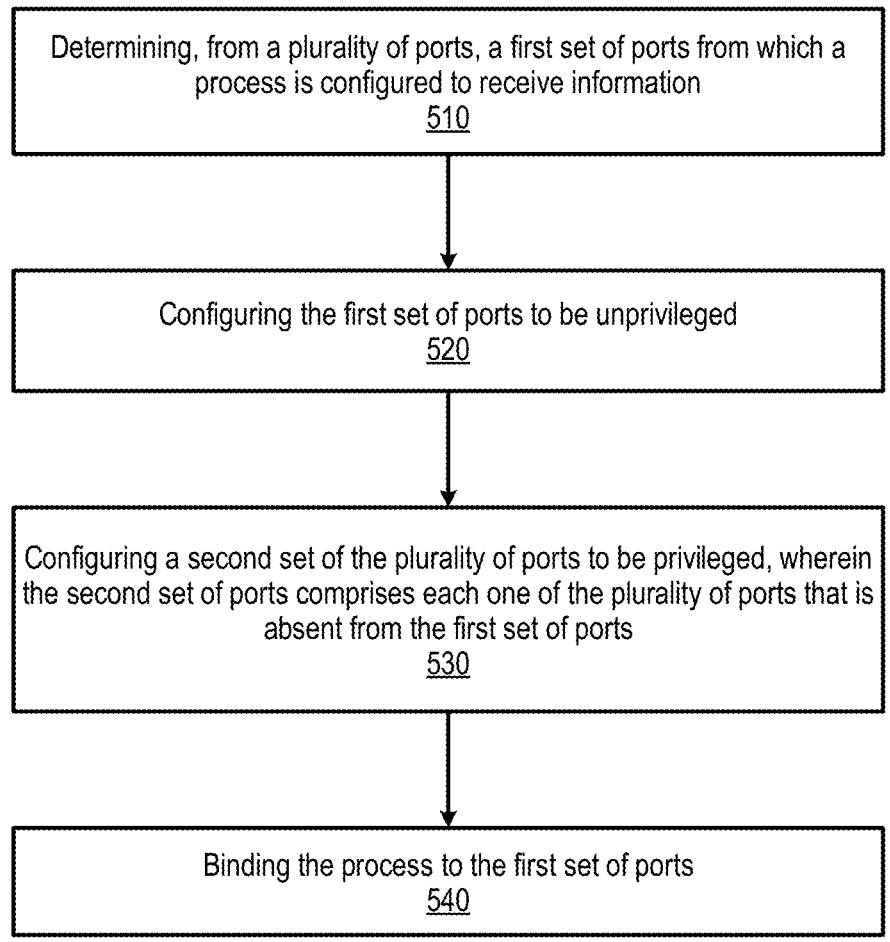
FIG. 5 is a flow diagram of a method for customizing unprivileged ports, in accordance with some embodiments of the present disclosure.

FIG. 5 is a flow diagram of a method 500 for customizing unprivileged ports, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 120, kernel 220, or a combination thereof as shown in FIGS. 1-4.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIGS. 5, method 500 begins at block 510, where processing logic determines, from a plurality of ports, a first set of ports from which a process is configured to receive information. For example, process 140 may be required to listen for network traffic on port 82. In some embodiments, the first set of ports is determined based on an unprivileged port list system control command that includes an unprivileged port list (e.g., unprivileged ports list 250 or unprivileged ports list 410 shown in FIGS. 3 and 4, respectively).

At block 520, processing logic configures the first set of ports to be unprivileged. In some embodiments, the first set of ports are numbered non-contiguously. Referring to FIG. 3, processing logic configures ports 75, 82, 200-230, and 1024-65535 as unprivileged. Referring to FIG. 4, processing logic configures ports 75, 82, 200-230, and 1024-2000 as unprivileged.

At block 530, processing logic configures a second set of the plurality of ports to be privileged. The second set of ports includes the remaining ports that are absent from the first set of ports. In some embodiments, the second set of ports includes the ports from 0-1023 that are not included in the first set of ports. For example, as shown in FIG. 3, configuration file 240 includes an unprivileged ports start system control command with a starting location (start port 300) and an unprivileged ports list system control command with an unprivileged ports list 250. In this example, processing logic configures remaining ports below 1024 that are not included in unprivileged ports list 250 as privileged. In some embodiments, the second set of ports includes ports from 0-65535 that are not included in the first set of ports. For example, as shown in FIG. 4, configuration file 240 includes an unprivileged ports list system control command with an unprivileged ports list 410. In this example, processing logic configures the remaining ports that are not included in unprivileged ports list 410 as privileged. In some embodiments, processing logic configures unprivileged ports prior to configuring the privileged ports.

At block 540, processing logic binds the process to the first set of ports. For example, FIG. 1 shows that process 140 binds to the first set of ports (unprivileged ports 160). In some embodiments, processing logic configures unprivileged ports prior to configuring the privileged ports.

Figure 6:
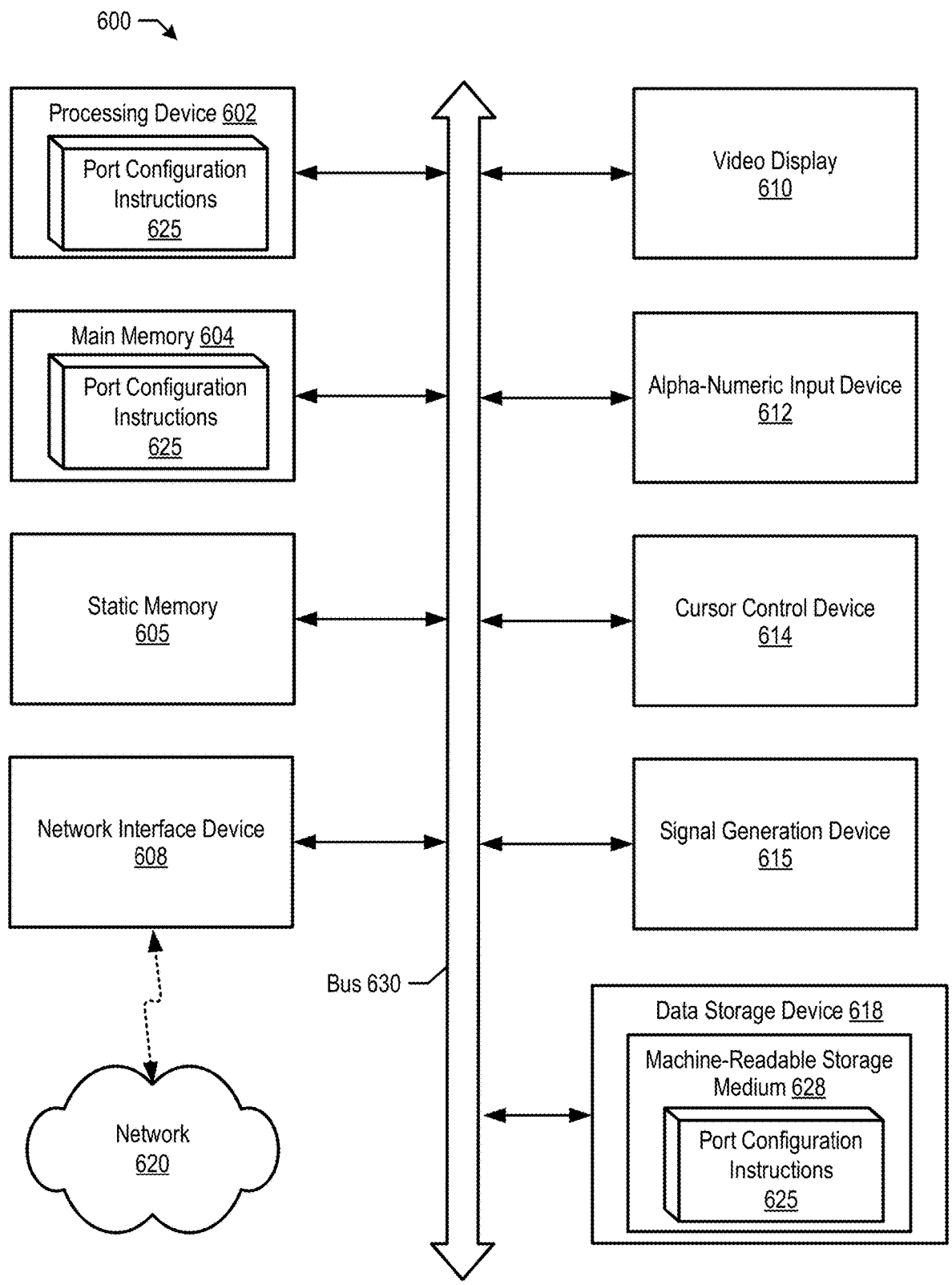
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers. In some embodiments, computer system 600 is an example form of computer system 110 shown in FIG. 1.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute port configuration instructions 625, for performing the operations and steps discussed herein.

The data storage device 618 may include a machine-readable storage medium 628, on which is stored one or more sets of port configuration instructions 625 (e.g., software) embodying any one or more of the methodologies of functions described herein. The port configuration instructions 625 may also reside, completely or at least partially, within the main memory 604 or within the processing device 602 during execution thereof by the computer system 600; the main memory 604 and the processing device 602 also constituting machine-readable storage media. The port configuration instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "determining," "configuring," "binding," "adding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   determining, from a plurality of ports, a first set of ports from which a process is configured to receive information;
   configuring, by a processing device using a kernel, the first set of ports to be unprivileged and accessible by the process;
   configuring, by the processing device using the kernel, a second set of the plurality of ports to be privileged and accessible by the process when the process has a root privilege, wherein the second set of ports comprises each one of the plurality of ports that is absent from the first set of ports;
   binding the process to the first set of ports;
   determining, from the plurality of ports, a third set of ports from which a subsequent process is configured to receive subsequent information, wherein the third set of ports comprises one or more different ports from the first set of ports;
   configuring the third set of ports to be unprivileged;
   configuring a fourth set of the plurality of ports to be privileged, wherein the fourth set of ports comprises each one of the plurality of ports absent from the third set of ports; and
   binding the process to the third set of ports.

2. The method of claim 1, wherein the process is an unprivileged process, and wherein the plurality of ports are between 0 and 65535.

3. The method of claim 1, wherein the process is an unprivileged process, and wherein the plurality of ports are between 0 and 1023.

4. The method of claim 3, wherein the determining of the first set of ports is based on an unprivileged port list system control command provided to the kernel.

5. The method of claim 4, further comprising:
   adding the unprivileged port list system control command to a configuration file, wherein the unprivileged port list system control command comprises an unprivileged port list corresponding to the first set of ports from which the process is configured to receive the information.

6. The method of claim 1, wherein the first set of ports are numbered non-contiguously.

7. The method of claim 1, wherein the kernel executes both the process in a first namespace and the subsequent process in a second namespace.

8. A system comprising:
   a processing device; and
   a memory to store instructions that, when executed by the processing device cause the processing device to:
   determine, from a plurality of ports, a first set of ports from which a process 1s configured to receive information; configure, using a kernel, the first set of ports to be unprivileged and accessible by the process; configure, using the kernel, a second set of the plurality of ports to be privileged and accessible by the process when the process has a root privilege, wherein the second set of ports comprises each one of the plurality of ports that is absent from the first set of ports;
   bind the process to the first set of ports;
   binding the process to the first set of ports;
   determining, from the plurality of ports, a third set of ports from which a subsequent process is configured to receive subsequent information, wherein the third set of ports comprises one or more different ports from the first set of ports;
   configuring the third set of ports to be unprivileged;
   configuring a fourth set of the plurality of ports to be privileged, wherein the fourth set of ports comprises each one of the plurality of ports absent from the third set of ports; and
   binding the process to the third set of ports.

9. The system of claim 8, wherein the process is an unprivileged process, and wherein the plurality of ports are between 0 and 65535.

10. The system of claim 8, wherein the process is an unprivileged process, and wherein the plurality of ports are between 0 and 1023.

11. The system of claim 10, wherein the first set of ports is determined based on an unprivileged port list system control command provided to the kernel.

12. The system of claim 11, wherein the processing device, responsive to executing the instructions, further causes the system to:
   add the unprivileged port list system control command to a configuration file, wherein the unprivileged port list system control command comprises an unprivileged port list corresponding to the first set of ports from which the process is configured to receive the information.

13. The system of claim 8, wherein the first set of ports are numbered non-contiguously.

14. The system of claim 8, wherein the processing device, responsive to executing the instructions, further causes the system to:
   determine, from the plurality of ports, a third set of ports from which a subsequent process is configured to receive subsequent information, wherein the third set of ports comprises one or more different ports from the first set of ports;
   configure the third set of ports to be unprivileged;
   configure a fourth set of the plurality of ports to be privileged, wherein the fourth set of ports comprises each one of the plurality of ports absent from the third set of ports; and
   bind the process to the third set of ports, wherein the kernel executes both the process in a first namespace and the subsequent process in a second namespace.

15. A non-transitory computer readable medium, having instructions stored thereon which, when executed by a processing device, cause the processing device to:

determine, from a plurality of ports, a first set of ports from which a process is configured to receive information;

configure, by the processing device, the first set of ports to be unprivileged and accessible by the process;

configure a second set of the plurality of ports to be privileged and accessible by the process when the process has a root privilege, wherein the second set of ports comprises each one of the plurality of ports that is absent from the first set of ports; and bind the process to the first set of ports;

binding the process to the first set of ports;

determine, from the plurality of ports, a third set of ports from which a subsequent process is configured to receive subsequent information, wherein the third set of ports comprises one or more different ports from the first set of ports;

configure the third set of ports to be unprivileged;

configure a fourth set of the plurality of ports to be privileged, wherein the fourth set of ports comprises each one of the plurality of ports absent from the third set of ports; and binding the process to the third set of ports.

16. The non-transitory computer readable medium of claim 15, wherein the process is an unprivileged process, and wherein the plurality of ports are between 0 and 65535.

17. The non-transitory computer readable medium of claim 15, wherein the process is an unprivileged process, and wherein the plurality of ports are between 0 and 1023.

18. The non-transitory computer readable medium of claim 15, wherein the processing device is to:

add an unprivileged port list system control command to a configuration file, wherein the unprivileged port list system control command comprises an unprivileged port list corresponding to the first set of ports from which the process is configured to receive the information.

19. The non-transitory computer readable medium of claim 15, wherein the first set of ports are numbered non-contiguously.

* * * * *